United States Patent Office 2,854,364
Patented Sept. 30, 1958

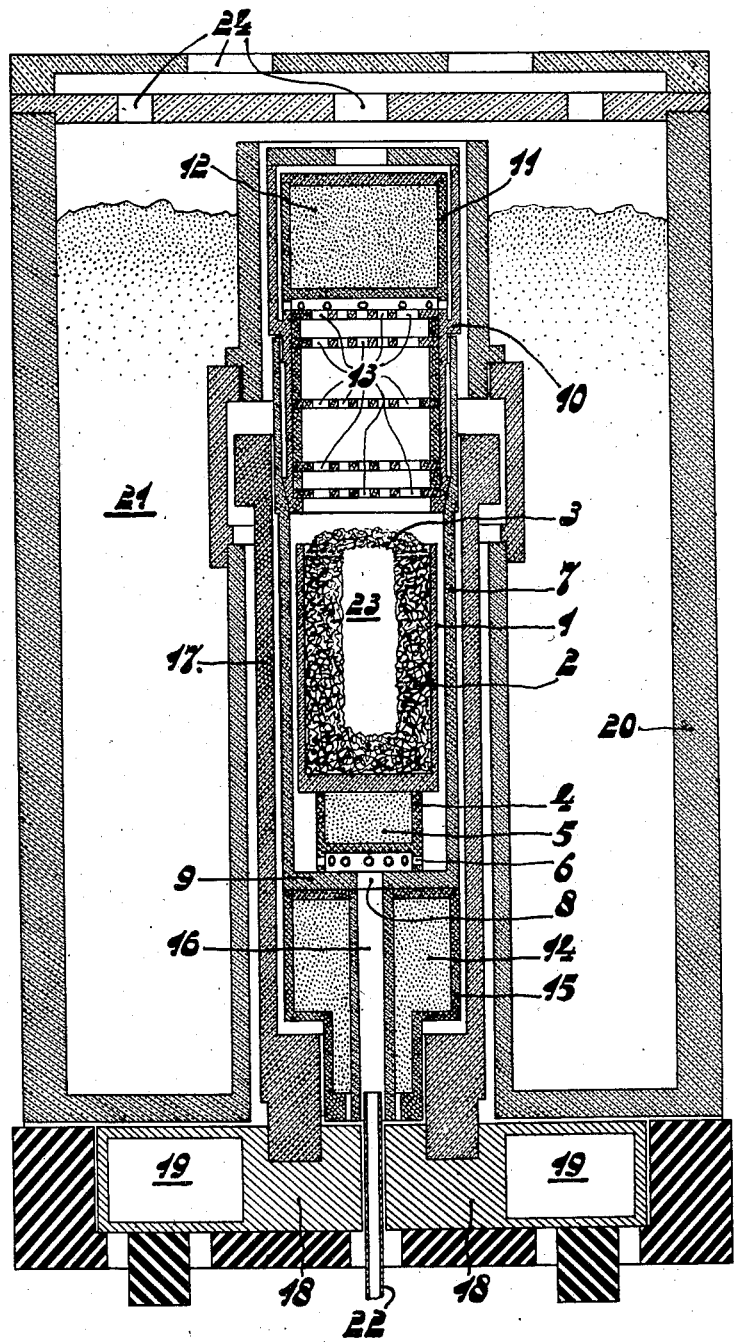

2,854,364

SUBLIMATION PROCESS FOR MANUFACTURING SILICON CARBIDE CRYSTALS

Jan Anthony Lely, Emmasingel, Eindhoven, Netherlands, assignor, by mesne assignments, to North American Philips Company, Inc., New York, N. Y., a corporation of Delaware Application March 7, 1955, Serial No. 492,385

Claims priority, application Netherlands March 19, 1954

6 Claims. (Cl. 148—1.5)

The invention relates to the production of silicon carbide crystals by sublimation and to semi-conductive devices comprising such crystals.

The production of well-formed large crystals by means of sublimation generally requires that the vapour pressure of the substance required to be sublimed is maintained low, that the temperature gradient in the vessel in which the sublimation is carried out is small and that the occurrence of gas currents is avoided as far as possible.

Due to the fact that silicon carbide produces a sufficient vapour pressure only at temperatures exceeding 2000° C. and that, at such high temperatures, of the usual heat resistance materials only carbon does not react with silicon carbide so as to cause the absorption of foreign impurities, the sublimation can not be carried out in a closed gastight vessel. Consequently, the sublimation will have to be carried out at a total gas pressure equal to that in the furnace. The furnace itself can be closed so as to be gastight so that the sublimation can be carried out at any desirable gas pressure.

When silicon carbide evaporates it dissociates into gaseous silicon and solid carbon. The silicon pressure is approximately 10 to 20% of the silicon carbide pressure. When a graphite vessel is used, not only silicon carbide vapour but also silicon vapour will diffuse through the wall into the furnace space on heating. Consequently well-formed crystals having reasonably large dimensions and always satisfactory with respect to composition cannot be obtained in this manner.

According to the invention these disadvantages are obviated by carrying out the sublimation in a protective gas in a space bounded by silicon carbide.

Silicon carbide is a very hard substance which cannot readily be machined so that a vessel entirely consisting of silicon carbide can only be manufactured with difficulty. According to a particular embodiment of the invention the sublimation is carried out in a graphite vessel which is internally lined with silicon carbide. This lining may, for example, be effected by arranging a core or mandrel in a graphite cylinder open at one end and filling the space between the graphite wall and the core with lumps of silicon carbide. After packing of the lamps, the core can be removed carefully, leaving a central open space, and the open upper end of the cylinder can be closed with a lump of silicon carbide. As an alternative, the graphite vessel may be lined with powdered silicon carbide to which water glass is added as a binding agent.

When sublimation is carried out at approximately atmospheric pressure, the sublimation vessel is heated to approximately 2500° C. By the use of suitable heat insulation local temperature differences are restricted, so that even at the points exhibiting the lowest temperatures, in a reasonably short period of time, for example from 4 to 7 hours, at the obtaining low vapour pressure of, for example, 5 to 50 mms. of mercury, which pressure is produced by the silicon carbide bounding the walls of the sublimation space which acts as the starting material, crystals of a size of, for example, from 4 to 10 mms. are enabled to grow.

Due to the fact that in carrying out the process in accordance with the invention use is made of a space bounded by silicon carbide the equilibrium vapour pressure of silicon carbide and silicon will always obtain in this space so that the crystals which settle contain no free carbon. It is true that material of the outer layer of the silicon carbide bounding the sublimation space will evaporate and dissociate and reach the furnace space but this does not influence the sublimation.

Impermissible gas currents in the sublimation space can be counteracted by causing the protective gas to flow through this space at a very low rate. Preferably, however, use is made of a sublimation vessel which communicates with the gas flow at one end only so that currents are substantially precluded.

Suitable gases for the protective gas atmosphere are rare gases, hydrogen and carbon monoxide. Hydrocarbons will decompose at the prevailing temperature to form $C_2H_2+H_2$ with the separation of carbon. Since this carbon may clog the installation, hydrocarbons should preferably not be used.

When pure starting material (impurities less than 0.002%) is utilized as the SiC lining, crystals substantially clear as glass having a resistivity of $10^3$ ohm-cm. and more can be obtained by a single sublimation. A starting material of sufficient purity can be produced in known manner by heating silicic acid and carbon to a temperature of approximately 1800° C. according to the reaction equation $SiO_2+3C \rightarrow SiC+2CO$.

The sublimation produces a material purification of the original silicon carbide. It is true that impurities present in the silicon carbide such as, for example, N, P, As, B, Al and Fe will also evaporate so that on condensation a certain amount of these impurities, which is dependent on the partial pressure of their vapour in the gas atmosphere, will be incorporated in the crystal. However, this amount is very slight due to the fact that the distribution coefficient (that is to say the ratio of the concentration of the impurity in the solid substance to that in the vapour) is very small, for example approximately $10^{-3}$ for aluminum in accordance with the partial pressure, and also $10^{-3}$ for nitrogen, with a concentration of 0.5% in the protective gas at atmospheric pressure.

The presence of impurities in the crystals produces electrical conductivity, namely n-conductivity with elements of a valency exceeding 4, such as for example N, P, As, which can act as donors, and p-conductivity with elements of a valency less than 4, such as for example B, Al, and so on, which can act as acceptors. When donor impurities are present the colour of the silicon carbide becomes green to green-black and when acceptor impurities are present it becomes blue to blue-black.

The amount of the donor and acceptor impurities can be controlled by means of the vapour pressure of the donor or acceptor in elementary form or in the form of a compound in the gas in which the sublimation is carried out. During sublimation the partial pressure of the impurities in the sublimation space can be maintained constant. Consequently, in this event crystals are obtained having a composition which is constant throughout the mass.

When nitrogen is used as a donor this is readily realised by adding this gas to the atmosphere. Phosphorus can be introduced in the gas in the form of $PCl_3$ or $PH_3$ and arsenic and antimony in the form of $AsCl_3$ and $SbCl_3$ respectively.

The amount of aluminum required to produce crystals having p-conductivity can be controlled by adding it in the form of $AlCl_3$. However, in this event allowance should be made for the fact that in hydrogen at a temperature exceeding 1000° C. the reaction proceeds $4AlCl_3 + 6H_2 + 3C \rightarrow Al_4C_3 + 12HCl$, and $Al_4C_3$ at a temperature below 2000° C. does not have a sufficient vapour pressure. Consequently in the presence of $AlCl_3$, which up to 3000° C. itself does not react with C, the sublimation can only be carried out in an atmosphere of inert rare gas or carbon monoxide. A similar complication occurs when boron is added in the form of $BCl_3$ and consequently in this event also the sublimation is carried out in an inert rare gas or in carbon monoxide.

With a sufficient concentration of the impurities in the initial material, i. e., the silicon carbide lining, it is also possible to produce n-type and p-type crystals. The addition of controlled amounts of the donor and acceptor impurities can be effected in the starting material. In order to produce this material use may, for example, be made of a mixture of $SiO_2+C$ to which $Na_3PO_4$ or $Al_2O_3$ is added as initial material. The donor or acceptor is then previously built in the SiC lattice. However, a mixture of SiC and the impurity in elementary form or in the form of a compound may also be used as initial material. In accordance with the distribution coefficient during sublimation the separated crystals will have the desirable donor or acceptor concentration.

Finally, crystals can be produced having adjacent zones of different conductivity, more particularly of opposite conductivity type, by adding locally a controlled amount of the donor and/or acceptor impurities to the crystals. This can be effected by varying the vapour pressure of an impurity during sublimation and, if the formation of crystals having zones of opposite conductivity type is required, by causing the vapour pressure of donor and acceptor impurities respectively to predominate alternately.

As an alternative, the impurities can partly be added to the initial material and partly to the gas atmosphere. In order to produce crystals comprising p-n junctions use may, for example, be made of SiC containing a controlled amount of impurity as initial material which is sublimed in a protective gas together with an impurity which gives rise to the formation of silicon carbide having the opposite conductivity type. If in this case use is made of a protective gas containing a proportion of the last-mentioned impurity, which proportion may, if required, be varied periodically, silicon carbide will separate out which has a conductivity corresponding to the first-mentioned or last-mentioned impurity respectively according as the vapour pressure of the impurity originating from the initial material or the impurity which is added to the gas predominates in the sublimation atmosphere with the result that crystals having p-n junctions are obtained.

The silicon carbide crystals produced in accordance with the invention can be used in semi-conductive devices, such as rectifiers, transistors and voltage-dependent resistors.

The process according to the invention can be carried out with the use of an apparatus of the kind shown diagrammatically in the accompanying drawing, in the sole figure of which 1 designates a graphite cylinder open at one end. On the bottom and along the walls lumps of silicon carbide 2 are piled and the aggregate is closed by a lump 3 of the same substance. This vessel 1 is arranged on a cylindrical member 4 which is filled with soot 5 with a view to satisfactory heat insulation and comprises small apertures 6. The assembly is surrounded by a slightly larger graphite cylinder 7 comprising an aperture 8 in the bottom 9. The upper end of the cylinder 7 is closed by the graphite member 10 in which a cylindrical member 11 made of graphite is arranged which similarly to the member 4 is filled with soot 12, and by a number of grates 13. The assembly is arranged together with an insulating member 15 made of graphite and filled with soot 14 which comprises a duct 16 in a carbon furnace 17. This carbon furnace consists of a graphite cylinder open at both ends and having two sawcuts formed in it for a large part of its length which extend so as to be parallel to its axis. At the sawed end of the cylinder copper electrodes 18 comprising water cooling portions 19 are arranged on each part between the sawcuts. Finally the assembly is surrounded by an insulating jacket 20 which is filled with soot 21.

At the lower end of the apparatus the protective gas used in sublimation can be introduced. This gas flows through a supply pipe 22, the duct 16 and the apertures 8 and 6, between the vessel 1 and the cylinder 7, and through apertures in and at the sides of the lump of silicon carbide 3 and communicates with the sublimation space 23 without giving rise therein to inconvenient gas currents. Thereupon the gas passes the grates 13 provided in the circuit in order to condense the vapour carried along by the gas flow and flows out through apertures 24.

The gas required to protect the carbon furnace 17 is separately introduced into the space between the graphite cylinder 7 and the insulating jacket.

*Example I*

A cylindrical graphite vessel which is open at one end, has an inner diameter of 70 mms. and an outer diameter of 80 mms. and is 130 mms. long, is lined internally by piling lumps of pure silicon carbide (impurities less than 0.002%) so as to surround a central mandrel 25 mms. thick which is later removed. Consequently the silicon carbide layer, which acts as the starting material as well as the furnace lining is approximately 20 to 25 mms. thick. A layer of approximately equal thickness is arranged on the bottom of the vessel also and the open upper end of the vessel is closed by a lump of silicon carbide. The total amount of silicon carbide which thus surrounds the sublimation space 23, is approximately 500 grm.

The vessel is arranged in a device of the kind shown in the drawing and the assembly is evacuated under a bell jar in order to remove the air to a maximum extent. Thereupon pure hydrogen or argon is introduced until atmospheric pressure is attained and this gas is passed through at a rate of approximately 1 litre per minute measured at room temperature; this gas is also passed through the space comprising the furnace. Thereupon the temperature is raised in 1 hour to 2500±30° C. with aid of the carbon furnace and the vessel is maintained at this temperature for 6 hours. Finally it is cooled in approximately 5 hours.

The loosely piled silicon carbide has become a coherent unit which proves to be substantially entirely recrystallised. On the inner wall of the sublimation chamber very pure crystals are arranged. These have been grown by portions of the lining vaporizing, some of it decomposing, and depositing on other portions of the lining in the form of very pure silicon carbide crystals.

The crystals can be reached by carefully breaking up the silicon carbide mass. The yield of useful crystals is from 30 to 200. The remainder of the mass can be used again.

The obtained transparent and substantially colourless crystals exhibit a very slight n-conductivity due to the presence of traces of nitrogen (less than $10^{-4}\%$) in the gas flow and a resistivity of approximately 1000 ohm cm.

*Example II*

If silicon carbide is treated in the manner described in Example 1 in a gas flow to which nitrogen has been added, products of high n-conductivity are obtained. In the following table the resistivity, the analytically determined nitrogen content, the number of incorporated nitrogen atoms per $cm.^3$ calculated therefrom and the number of current carriers per $cm.^3$ determined from the Hall coefficient at a temperature of from 600 to 800° C. are listed of a number of crystals obtained in a gas atmosphere of varying nitrogen content. The agreement between the electrically determined number of current carriers and the number of analytically determined nitrogen atoms is striking. For the sake of completeness it should be noted that the crystals were analysed by heating them to 2300° C. in vacuo, capturing the liberated gas and determining the nitrogen content thereof.

| No. | Percent by volume of $N_2$ in $H_2$ at 1 atm. | Resistivity in ohm-cm. | Analytically determined percent of $N_2$ in crystal | Calculated from analysis, atoms $N/cm.^3$ | Calculated from Hall coefficient, electrons/$cm.^3$ |
|---|---|---|---|---|---|
| 1 | 0.5 | 0.17 | $1.2 \times 10^{-3}$ | $1.65 \times 10^{18}$ | $1.9 \times 10^{18}$ |
| 2 | 2 | | $3.8 \times 10^{-3}$ | $5.2 \times 10^{18}$ | $\sim 6 \times 10^{18}$ |
| 3 | 13 | | $1.3 \times 10^{-2}$ | $1.8 \times 10^{19}$ | $4.1 \times 10^{19}$ |
| 4 | 75 | 0.006 | $4 \times 10^{-2}$ | $5.8 \times 10^{19}$ | $7.7 \times 10^{19}$ |

*Example III*

Addition of Al enables the production of silicon carbide crystals of p-conductivity. An apparatus of the kind shown in the drawing is filled with pure silicon carbide in the manner described in Example 1. After evacuation under a bell jar, pure argon is introduced until atmospheric pressure is attained and passed through at a rate of one litre per minute measured at room temperature. Argon is also passed as a protective gas through the space comprising the furnace. Thereafter the furnace is heated and, when a temperature of from 1000 to 1500° C. is reached, $AlCl_3$ is added to the argon flow. The gas supply pipe is maintained at a temperature of from 150 to 200° C.

The $AlCl_3$ is added to the gas flow by passing the argon loaded with a chlorine carbon compound, for example $CCl_4$, over aluminum at a temperature of from 400 to 500° C. The amount of $CCl_4$ present in the gas is thus quantitatively converted into $AlCl_3$. The $CCl_4$ concentration in the gas can be readily controlled by means of the temperature imparted to the liquid $CCl_4$ and of the rate of flow of the argon which is passed through this liquid.

The $AlCl_3$ carried along by the gas flow reaches the sublimation space by diffusion.

The sublimation is carried out at a temperature of approximately 2560° C. for example 6 hours after which cooling is effected for approximately 5 hours. When the temperature in the sublimation space has dropped to approximately 2000° C., the apparatus is washed further with argon having no $AlCl_3$ added to it. In the following table the analytically determined aluminum content, the number of incorporated aluminum atoms per $cm.^3$ calculated therefrom and the number of current carriers per $cm.^3$ at 500 to 600° C. determined from the Hall coefficient is given of a number of crystals produced by sublimation in argon at atmospheric pressure with a varying $AlCl_3$ concentration.

| No. | Percent of $AlCl_3$ in argon at 1 atm. | Analytically determined percent of Al in crystal | Calculated from analysis, atoms of $Al/cm.^3$ | From Hall coefficient, holes/$cm.^3$ |
|---|---|---|---|---|
| 1 | 0.0093 | | | $3 \times 10^{17}$ |
| 2 | 0.056 | 0.003 | $2 \times 10^{18}$ | |
| 3 | 0.53 | 0.014 | $1 \times 10^{19}$ | $\sim 10^{19}$ |
| 4 | 1.9 | 0.20 | $1.4 \times 10^{19}$ | |

*Example IV*

In this example, the starting material was SiC containing a proportion of 0.3% of aluminum. Such a product was obtained by heating a mixture of carbon, silicic acid and aluminum oxide to a temperature of 2000° C. in hydrogen. If this product is subjected to a treatment as described in Example 1 with the use of carbon monoxide as protective gas, crystals are obtained having an Al-content of 0.005% and p-conductivity.

*Example V*

If pure silicon carbide is subjected to a treatment of the kind described in Example III in an atmosphere of argon containing $AlCl_3$, crystals of p-conductivity will be produced at a concentration of 0.06%. After these crystals have grown for 4 hours argon is introduced in which the $AlCl_3$ addition is replaced by 1% of nitrogen, after which the crystals grow for three hours during which time nitrogen-containing SiC settles. The occurrence of rectification proves that a p-n junction is produced in the crystals, which junction is also visible by the colour difference.

What is claimed is:

1. A process for producing silicon carbide crystals by sublimation, comprising providing a heat-insulated carbon vessel open at one end, completely lining the interior, including the open end, of the vessel with substantially pure silicon carbide to define an empty center space, flowing a protective gas past the vessel so that it communicates with the lined open end thereof, and heating the vessel at an elevated temperature at which silicon carbide vaporizes from portions of the lining into the empty space and substantial portions of which decompose into its constituent atoms, which redeposit on other portions of the lining in the form of very pure silicon carbide crystals.

2. A process as set forth in claim 1 wherein the silicon carbide lining contains a conductivity-determining impurity selected from the group consisting of donor and acceptor impurities, whereby vapor of the impurity is established in the center space during the heating step thereby to produce crystals of a predetermined conductivity type.

3. A process for producing silicon carbide crystals by sublimation, comprising providing a heat-insulated carbon vessel open at one end, completely lining the interior, including the open end, of the vessel with substantially pure silicon carbide to define an empty center space, flowing a gas mixture constituted of a protective gas and a gaseous impurity at a controlled vapor pressure and selected from the group consisting of donor and acceptor impurities past the vessel so that it communicates with the lined open end thereof, and heating the vessel at an elevated temperature at which silicon carbide vaporizes from portions of the lining into the empty space and substantial portions of which decompose into its constituent atoms, which redeposit on other portions of the lining in the form of very pure silicon carbide crystals doped by impurities and exhibiting a predetermined conductivity type.

4. A process for producing silicon carbide crystals by sublimation, comprising providing a heat-insulated refractory vessel open only at one end, completely lining the interior, including the open end, of the vessel with pure silicon carbide to define an empty center space, flowing a protective gas at atmospheric pressure to the vessel so that it communicates with the lined open end thereof, and heating the vessel at an elevated temperature of approximately 2500° C. at which portions of the lining vaporize into the empty space and redeposit on other portions in the form of very pure silicon carbide crystals.

5. A process as claimed in claim 4 wherein a gaseous impurity selected from the group consisting of acceptor and donor impurities is added to the protective gas so as to incorporate impurity atoms into the grown crystal whereby it exhibits a desired conductivity.

6. A process for producing silicon carbide crystals by sublimation, comprising providing a heat-insulated refractory vessel open only at one end, completely lining the interior, including the open end, of the vessel with pure silicon carbide to define an empty center space, flowing a gas mixture at atmospheric pressure and comprising a protective gas and an impurity gas selected from the group consisting of donor and acceptor impurities to the vessel so that it communicates with the lined open end thereof, heating the vessel at an elevated temperature of approximately 2500° C. at which portions of the lining vaporize into the empty space and redeposit on other portions in the form of very pure silicon carbide crystals, and controlling the vapor pressure of the impurity gas to produce crystals with a p–n junction therein.

References Cited in the file of this patent

UNITED STATES PATENTS

| | | |
|---|---|---|
| 913,324 | Tone | Feb. 23, 1909 |
| 992,698 | Tone | May 16, 1911 |
| 2,005,956 | Ridgway | June 25, 1935 |
| 2,178,773 | Benner et al. | Nov. 7, 1939 |
| 2,701,216 | Seiler | Feb. 1, 1955 |